United States Patent
Harris

(10) Patent No.: US 8,335,546 B2
(45) Date of Patent: Dec. 18, 2012

(54) PORTABLE TELEPHONE WITH CONNECTION INDICATOR

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 692 days.

(21) Appl. No.: 12/340,573

(22) Filed: Dec. 19, 2008

(65) Prior Publication Data

US 2010/0160001 A1 Jun. 24, 2010

(51) Int. Cl.
*H04B 1/06* (2006.01)
*H04M 1/00* (2006.01)

(52) U.S. Cl. ........ 455/573; 455/344; 455/346; 455/572; 455/556.1

(58) Field of Classification Search .... 455/343.1–343.6, 455/344, 418, 420, 550.1, 556.1–556.2, 557–559, 455/567, 571–573, 575.2, 575.4, 41.2, 346, 455/349, 575.1; 320/116–117, 121, 123, 320/134, 136, 138, 149, 151–152, 165
See application file for complete search history.

(56) References Cited

U.S. PATENT DOCUMENTS

| | | | | |
|---|---|---|---|---|
| 5,903,135 A | * | 5/1999 | Posses et al. | 320/114 |
| 6,978,119 B2 | * | 12/2005 | Chen | 455/41.2 |
| 2004/0203490 A1 | * | 10/2004 | Kaplan | 455/90.1 |
| 2005/0093708 A1 | * | 5/2005 | Dupeire | 340/664 |
| 2006/0025074 A1 | * | 2/2006 | Liang et al. | 455/41.2 |
| 2006/0111053 A1 | * | 5/2006 | Wu et al. | 455/90.3 |
| 2007/0167194 A1 | * | 7/2007 | Brown et al. | 455/567 |
| 2007/0202807 A1 | * | 8/2007 | Kim | 455/41.2 |
| 2007/0202934 A1 | * | 8/2007 | Kim | 455/575.3 |
| 2008/0194203 A1 | * | 8/2008 | Hong | 455/41.2 |
| 2008/0224659 A1 | * | 9/2008 | Singh | 320/114 |
| 2008/0242229 A1 | * | 10/2008 | Sharma | 455/88 |
| 2008/0263451 A1 | * | 10/2008 | Portele et al. | 715/727 |
| 2009/0163247 A1 | * | 6/2009 | Song | 455/566 |

OTHER PUBLICATIONS

"LG premieres world's first phone with Built in Bluetooth Headset", Jun. 2008.

* cited by examiner

*Primary Examiner* — Meless Zewdu
(74) *Attorney, Agent, or Firm* — Law Office of Scott C. Harris, Inc.

(57) ABSTRACT

A slave device is charged directly from a cellular phone. The slave device can be charged along with the cellular phone or from the internal battery of the cellular phone. When the slave device is connected, a "click" sound is played through an enunciator of the cellular phone.

23 Claims, 2 Drawing Sheets

PORTABLE TELEPHONE WITH CONNECTION INDICATOR

BACKGROUND

Portable telephones are often used with auxiliary devices such as Bluetooth devices. Certain ordinances may require users use a hands-free device when operating a cell phone in the vehicle, for example. A problem, however, is that this requires that the user remember to bring two things into their vehicle: the phone and the handset. Forget either one, and you cannot make a call. Also, both of these units are driven from batteries. Both need to be charged. A typical way of doing this has been to charge the two devices separately. Either 2 chargers are necessary, or you charge one unit, then the other unit.

The LG decoy has a built-in Bluetooth handset that stores inside the phone, and allows charging the attached Bluetooth device at the same time as the phone.

SUMMARY

The present application describes improvements in a cellular phone of a type that controls connection to an external device, e.g, that houses an integrated hands-free device.

An embodiment describes a special device that produces an audible indication when a slave device, e.g., the Bluetooth headset device, is attached. The device also communicates with the handset, and also causes an audible communication when the handset device becomes low on charge.

Another embodiment may carry out similar operations when other devices are attached or communicating.

BRIEF DESCRIPTION OF THE DRAWINGS

These and other aspects will now be described in detail with reference to the accompanying drawings, wherein.

DETAILED DESCRIPTION

Figure 1A:
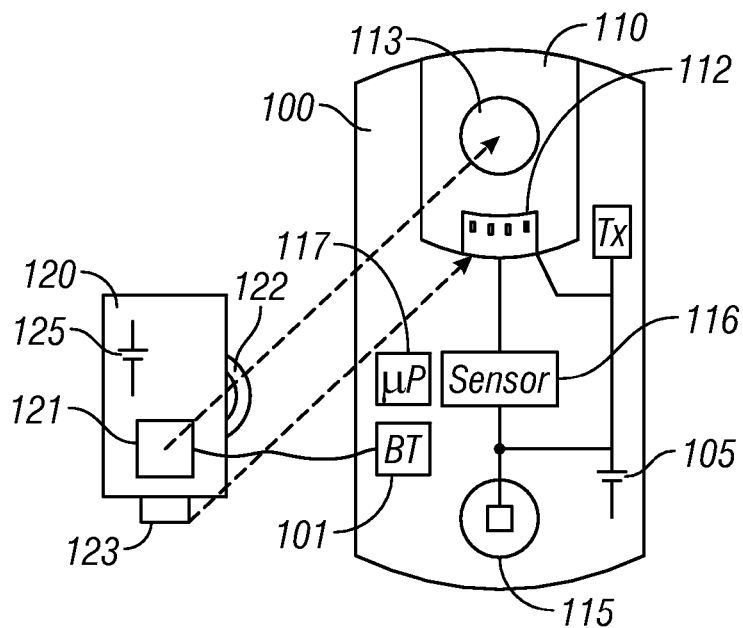
FIG. 1A shows a basic embodiment of a cellular phone where the slave is a Bluetooth device, and where an separate device creates a special sound when the device is attached.

FIG. 1A shows an embodiment. A master device, here a cellular phone device 100 includes a slave device 120 that communicates and is connectable therewith. In this embodiment, the slave device 120 is a Bluetooth wireless headset which is used for communicating via the cellular phone. Other embodiments may include other slave devices, e.g., RFID devices, wifi devices, and/or others.

A Bluetooth module 101 in the cellular phone device communicates with a corresponding Bluetooth module 121 in the Bluetooth device 120. The cellular telephone runs from a battery 105. In a similar way, the Bluetooth device 120 runs from power from a battery 125. Both batteries must be charged.

In this embodiment, the Bluetooth device 120 can be inserted into a corresponding area 110 within the main cellular phone. The earpiece 122 of the Bluetooth device can be connected into an earpiece receiving area 113 within the area 110. A connector 123 on the Bluetooth device 120 can connect to a corresponding connector 112 within the area 110. The connector 123 can provide both power and communication, allowing the slave battery—here Bluetooth battery 125 to be charged commonly with the cell phone. The slave battery 125 can be charged from either the charging source for the cellular phone or from the battery 105 within the cellular phone or battery. The slave battery connects to a battery connection, and charges through that battery connection.

The phone also includes a communicator device that allows communicating over a channel. The communicator device is powered from the battery 105.

The Bluetooth communication may carry out housekeeping functions such as determining status of the different devices. The Bluetooth communication can also carry out communication between the devices so that the user can use the Bluetooth device as a hands-free unit to talk over the cell phone.

The cellular phone also includes an enunciator shown as 115 which may be a ringer and/or the speaker which is otherwise used for a speakerphone.

A sensor 116 may sense when the Bluetooth device 120 is connected to the connector 112 and drawing power therefrom. In this embodiment, when the Bluetooth is properly connected, the detection of the connection between master and slave causes playback of an electronic file indicative of a clicking sound in one embodiment. The connection that is connected can be a charging connection, or a communication connection. When the connection is established, especially the charging connection, a "click" sound may be played. The click may be for example, the sound of a pen cap clicking on to the pen.

The file may be a compressed or uncompressed sound file, e.g., a wav or MP3 file, for example.

The file may represent some other sound. However, the clicking sound may be preferred in one embodiment, since it provides audio feedback that sounds like the sound that would be made when snapping a device into place. In the embodiment, however, the slave device is placed on the connector, and held without any kind of snap-action connection. Once held in place, the slave device is connected to the contacts, and charged by that connection. When the electrical connection is detected, the "click" sound is played through the enunciator of the phone. The connection makes a click sound, even though the device is not physically snapped into place. This provides feedback informing the user to inform them that they have properly electrically connected the slave unit into place. The electrical connection, which is not a snap connection, is enunciated as a snapping sound based on an electronic-based sound.

More generally, the sound which is played is a feedback sound for a proper electrical connection between the master and the slave. However, the sound represents a mechanical, not electrical action. This electronically-produced sound system provides feedback that the connectors are properly aligned and that the slave (Bluetooth) device is charging.

An advantage of such a device is that it does not require snap action devices but still provides an adequate feedback of the connection. When users do not have sufficient feedback about whether devices like this have been properly inserted, they will often press too hard on the device to press it into place. This over-inserts the device and possibly causes damage from pressing the device too hard.

Figure 1B:
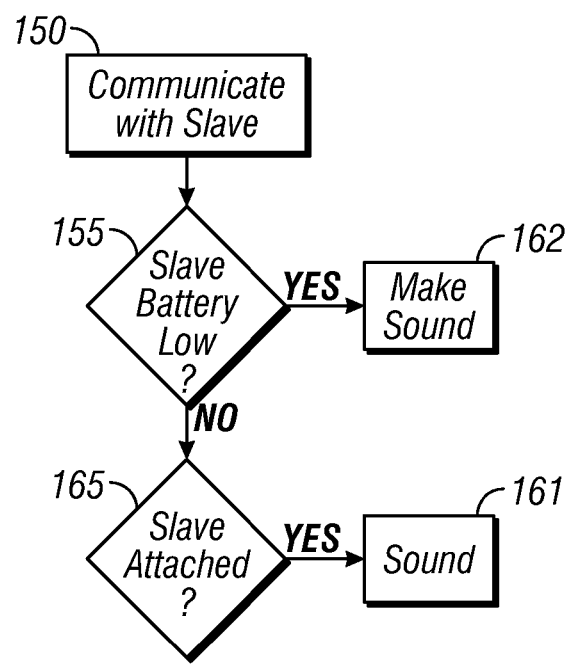
FIG. 1B shows a flowchart of operation carried out by a processor in the master device, e.g., cellular phone device and or communication controller.

The system may operate as shown in the flowchart of FIG. 1B, where the flowchart of FIG. 1B can be carried out by a processor such as 117 within the portable phone. The processor can be the telephone processor, a digital signal processor, or any other kind of processor that can carry out these operations.

At 150, the operation begins by the phone communicating with the slave, where the slave can be the Bluetooth unit. At 155, the phone queries the slave to detect the condition of the slave's battery. If the slave battery is too low, then the phone enunciator may play a sound at 160, for example a series of clicks, or another sound that may indicate that the battery is low.

If the slave battery is not low at 155, 165 detects whether the slave is attached. The detection of the slave may use the sensor 116 to detect current flow to the slave. At the moment the slave is attached, a sound is played at 161. The sound may be a click that has the same characteristics of snapping a device into place, e.g., the sound of a pen cap going on the end of a pen.

The above has described certain sounds that can be played during this operation. However, it should be understood that other sounds can be played. The sound can also be selectable, for example can be downloaded sounds, ring tones, or any sound of any type. The user might play a sound says "your battery is low" but preferably plays an audio sound that the user can get used to.

Also in this embodiment, the sound is played through the enunciator 115. However it should be understood that the sound can alternately be played through the earpiece 122 of the Bluetooth unit. In one embodiment, the sound may be played simultaneously through multiple speakers, e.g. the Bluetooth speaker 122 at the same time as being played through the enunciator 115. These two sounds may be played out of time and/or phase with one another to make a better sound effect of the item clicking into place.

Figure 2:
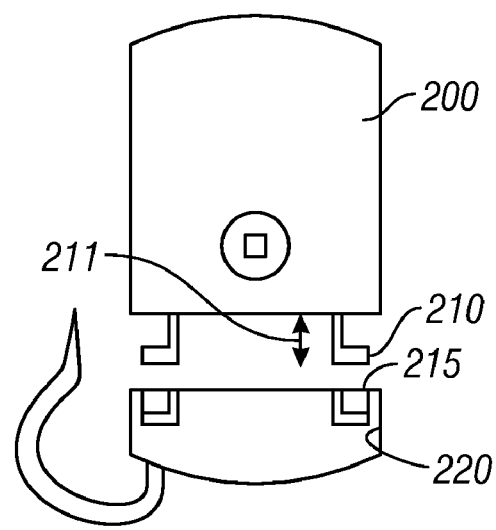
FIG. 2 shows a cellular phone with an alternative connection for a Bluetooth device.

FIG. 2 shows an alternative embodiment, in which the master (phone) 200 includes clips 210 on a bottom surface thereof. Those clips 210 clip into corresponding receiving portions 215 within a slave (wireless receiver such as a Bluetooth) unit 220. The clips may also have electrical contacts therein, which may also charge the receiver 220. Alternately, the electrical contacts can be separate from the clips. The embodiment of FIG. 2 may otherwise operate in the same way as the embodiment of FIG. 1A. The clips may be hook shaped and the slave slides on to the hooks in a way that maintains the position of the clips on those hooks. Alternately, the clips 210 may be movable, as shown by the arrow 211. In an embodiment, once the Bluetooth slave is attached onto the clips 210, the clips can be moved in a direction to hold the Bluetooth device more tightly, e.g., to retract based on an electrical force. The Bluetooth device can be removed, for example, by pressing a button to release the clips.

Figure 3:
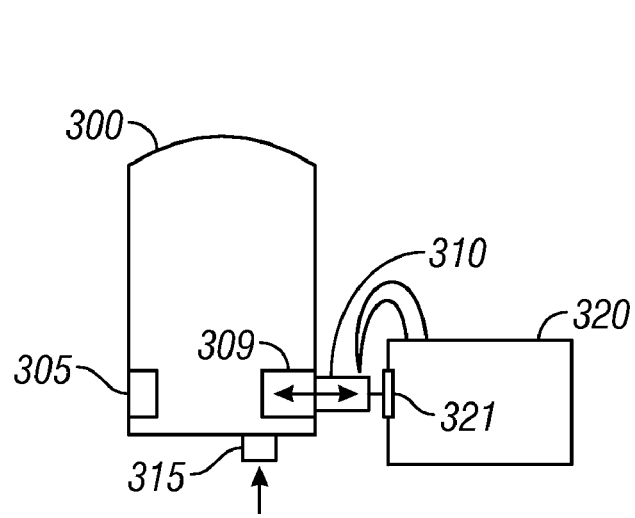
FIG. 3 shows yet another alternative for connecting with a Bluetooth device which includes an extendable and retractable connector of the type used for charging.

FIG. 3 shows an alternative embodiment in which the connector usually used for charging is used for its mechanical structure, to hold the slave onto the phone. In this embodiment, the phone 300 may include a charging port 305 which may be a mini USB port. In addition, however, the phone 305 may include a retractable male mini USB port connector 310. The connector 310 may be extended or retracted into position 309. The extension or retraction can use a sliding lever, or a button shown as 315. The sliding lever may use similar techniques to those used in USB drives to slide out the USB connector. The USB connector, once slid out, may be rigidly held in the outward position. In this embodiment, that connector is used to hold a Bluetooth device 320 of the type that is normally charged through a mini USB connector.

The extended USB connector 310 mates into the mini USB connector port 321. This holds the Bluetooth device into place on the phone.

While FIG. 3 shows this connector on an edge surface of the phone, this can be on any surface of the phone, and can be indented into the phone to allow easier carrying of the Bluetooth device.

In this embodiment, the Bluetooth device can communicate and charge as in the other embodiments.

Figure 4:
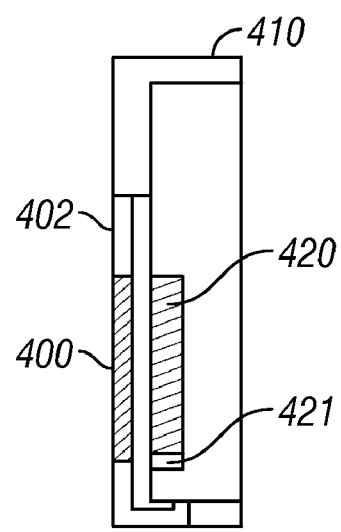
FIG. 4 shows another embodiment in which the slave device is an RFID device.

FIG. 4 shows an alternative embodiment in which the slave is an active RFID chip/assembly 400. Active RFID chips can carry out various operations including transmitting and receiving information. However, these RFID chips are often limited by their battery capacity. While the RFID chips use very low power, the battery size and form factor is limited by the packaging of the RFID device. In this embodiment, the RFID assembly may be in a flat adhesive package as conventional. The adhesive is attached to a battery door 402 of a cellular phone 410. The cellular phone 410 also includes a battery 420. In the embodiment, the RFID chip 400 has extending contacts that connect directly to the battery terminals 421 and is powered directly from those terminals when the battery door is in place. This allows the cellular phone to use the RFID chip as a slave in this embodiment. The RFID battery may be rechargeable so that it may be used even when the battery door is not in place or when the battery is discharged.

As in the above embodiments, the presence of the RFID device may cause the enunciator to make a "click" sound. For example, when the RFID device is brought on line, or when it is interrogated or carries out some action, the enunciator may "click".

The RFID slave may be used for many different functions, including inventory, e.g., to determine which phones are in stock. It can be used for taking attendance, e.g., to determine which people are in a room or in a class. It can be used to allow networking. It can also be used for other purposes.

The battery within the RFID chip may be rechargeable and may recharge directly from the battery 420 of the cellular phone and/or may be recharged when the main battery of the phone is recharged. This may contradict the usual paradigm where the capacity of the RFID chip must be limited so that its normal functions can operate from the battery of the RFID chip for the life of the chip. This system allows recharging that chip, and thereby allows the RFID chip to carry out more functions.

Another embodiment plays the sound, e.g., the "click" when the RFID chip carries out some function, e.g, when it is queried, or when it responds, or when its battery level becomes too low.

The general structure and techniques, and more specific embodiments which can be used to effect different ways of carrying out the more general goals are described herein.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, kinds of slaves other than Bluetooth and RFID can be mated with the phone.

Also, the inventor intends that only those claims which use the words "means for" are intended to be interpreted under 35 USC 112, sixth paragraph. Moreover, no limitations from the specification are intended to be read into any claims, unless those limitations are expressly included in the claims.

The master devices described herein may be any kind of computer, either general purpose, or some specific purpose computer such as a workstation. The computer may be a special purpose computer such as a PDA, cellphone, or laptop.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A telephone system comprising:
    a battery connection;
    a communicator device that communicates over a channel, said communicator device powered from said battery connection;
    an enunciator, that makes sounds associated with operations of said communicator device;
    a slave communication device that is physically operated from said communicator device, and which wirelessly receives information from said communicator device, and operates based on said information;
    a connection part for the slave communication device, said connection part including a charging connection for the slave communication device; and
    a detector for detecting that the slave communication device is being charged by said charging connection, and commanding a sound in said sounds to be played electronically through said enunciator responsive to said detecting said slave communication device being charged, said detector querying said slave communication device for detecting a condition of a battery that is powering said slave communication device and wherein said detector commanding a sound to be played electronically through said enunciator which indicates a condition of said battery of said slave communication device.

2. The telephone system as in claim 1, wherein said sound which is electronically played for said detecting that the slave communication device is being charged by said charging connection is a sound of a mechanical connection being established.

3. The telephone system as in claim 1, wherein said sound is played for a detection of a low battery in said slave communication device which is different than said sound played for said detecting that the slave communication device is being charged by said charging connection, and plays an electronic sound through said enunciator indicating said low battery.

4. The telephone system as in claim 1, wherein said slave communication device is a wireless communication device that communicates telephone conversations.

5. The telephone system as in claim 1, wherein said slave communication device is an RFID device.

6. The telephone system as in claim 4, wherein said slave communication device is a Bluetooth device.

7. The telephone system as in claim 1, wherein said slave communication device also includes a speaker thereon.

8. The telephone system as in claim 1, wherein said sounds is played through multiple different enunciators simultaneously, where one of said enunciator is on the communicator device and another of said enunciators is on the slave communication device.

9. The telephone system as in claim 8, wherein said sounds is played by said enunciators at slightly different phrases relative to one another but which overlaps in time with one another.

10. The telephone system as in claim 1, wherein said telephone is in a housing, and said connection part is on an edge surface of said housing.

11. The telephone system as in claim 1, wherein said connection part include clips that hold said slave device.

12. The telephone system as in claim 11, wherein said clips are movable.

13. The telephone system as in claim 1, wherein said connection part includes a connector that holds said slave device, and where said connector mates with a charging connector on said slave device.

14. The telephone system as in claim 13, wherein said charging connector is a USB connector.

15. The telephone system as in claim 1, wherein said connection part include clips that hold said slave device.

16. The telephone system as in claim 11, wherein said clips are movable between a first position and a second position to hold said slave device.

17. A telephone system comprising:
    a cellular phone that allows communicating over a channel;
    a charging connection for receiving an external electrical charge, said external electrical charge from said charging connection, and which charges an internal battery for the cellular phone which is connected and powers the cellular phone via a battery connection, and said charging connection also charges an external battery associated with a slave communication device associated with the cellular phone and which wirelessly communicates with the cellular phone;
    a battery connection;
    said cellular phone powered from said battery connection;
    an enunciator, that is used by said cellular phone to create sounds associated with said communicating over said channel;
    a connection part for the slave communication device, said connection part including a charging connection for the slave communication device; and
    a detector for detecting that the slave communication device is being charged by said charging connection, and commanding playing of a sound electrically through said enunciator, responsive to said slave communication device being charged, said detector also querying said slave communication device to detect a condition of a battery of said slave communication device and wherein said detector commanding the sound to be played electronically through said enunciator which indicates a condition of said battery of said slave communication device.

18. The telephone system as in claim 17, wherein said sound which is electronically played is a sound of a mechanical connection being established.

19. The telephone system as in claim 17, wherein said slave communication device is an RFID device.

20. The telephone system as in claim 17, wherein said slave communication device is a Bluetooth device.

21. The telephone system as in claim 17, wherein said sounds is played through multiple different enunciators simultaneously, where one of said enunciator is on the cellular phone and another of said enunciators is on the slave communication device.

22. The telephone system as in claim 21, wherein said sounds are played at slightly different times relative to one another.

23. A telephone system comprising:

a charging connection for receiving an external electrical charge, said external electrical charge from said charging connection which charges an internal battery for a cellular phone which is connected and powers the cellular phone via a battery connection, and said charging connection also charges an external battery, said external battery being associated with an RFID device that is attached to a housing of the cellular phone and where said RFID device wirelessly communicates with the cellular phone;

said cellular phone having a communicator device that allows communicating over a channel, said communicator device powered from said battery connection;

wherein said RFID device is charged by directly connecting to said battery connection;

the telephone system further comprising an enunciator, that makes sounds associated with use of the RFID device that is attached to said cellular phone; and wherein said RFID device is connected to a battery door of said cellular phone.

* * * * *